INVENTOR.
WILLIAM A. RINGLER
BY Reuben J. Carlson
ATTORNEY

Oct. 10, 1961  W. A. RINGLER  3,003,675
HINGED COVER BLANKS AND CARTONS
Filed March 8, 1954  6 Sheets-Sheet 2

INVENTOR.
WILLIAM A. RINGLER
BY
*Reuben J. Carlson*
ATTORNEY.

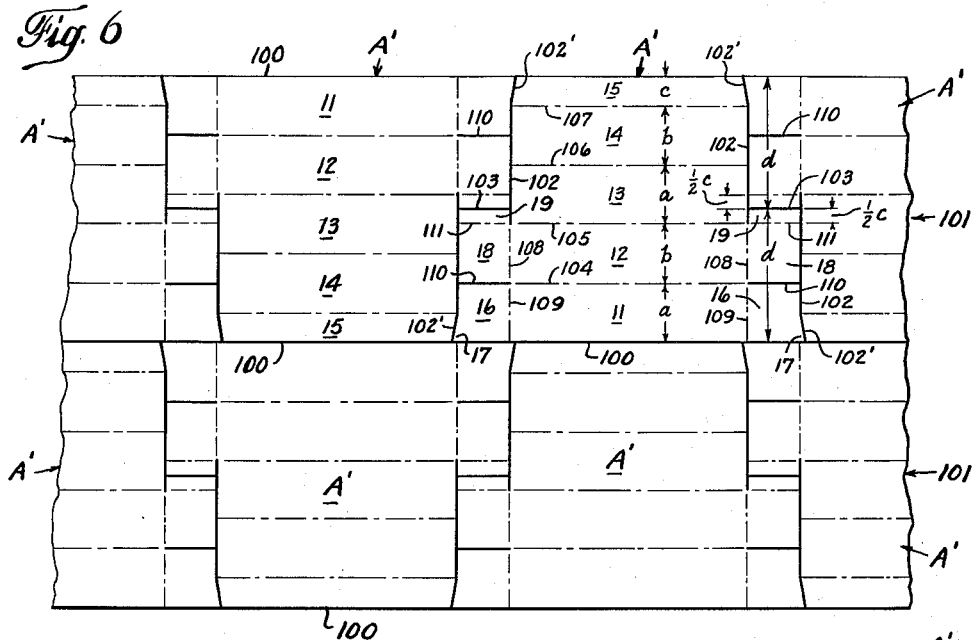
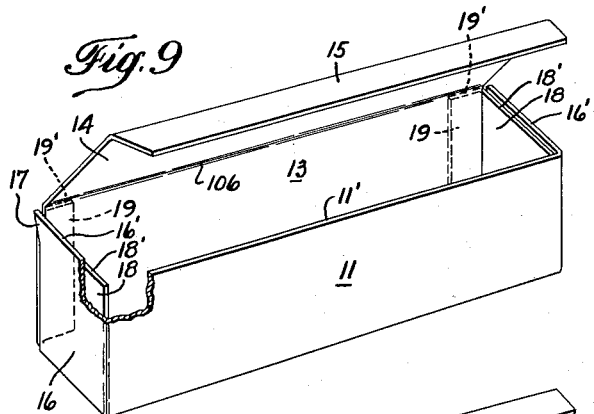
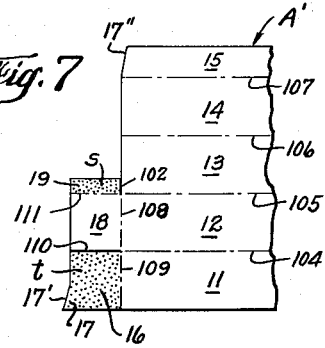
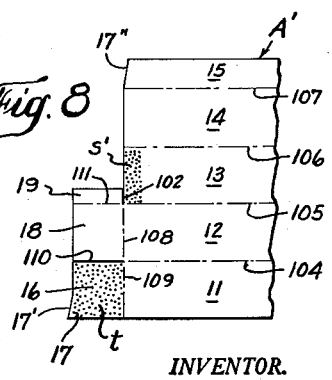
INVENTOR.
WILLIAM A. RINGLER
BY
Reuben J. Carlson
ATTORNEY.

Oct. 10, 1961 W. A. RINGLER 3,003,675
HINGED COVER BLANKS AND CARTONS
Filed March 8, 1954 6 Sheets-Sheet 4
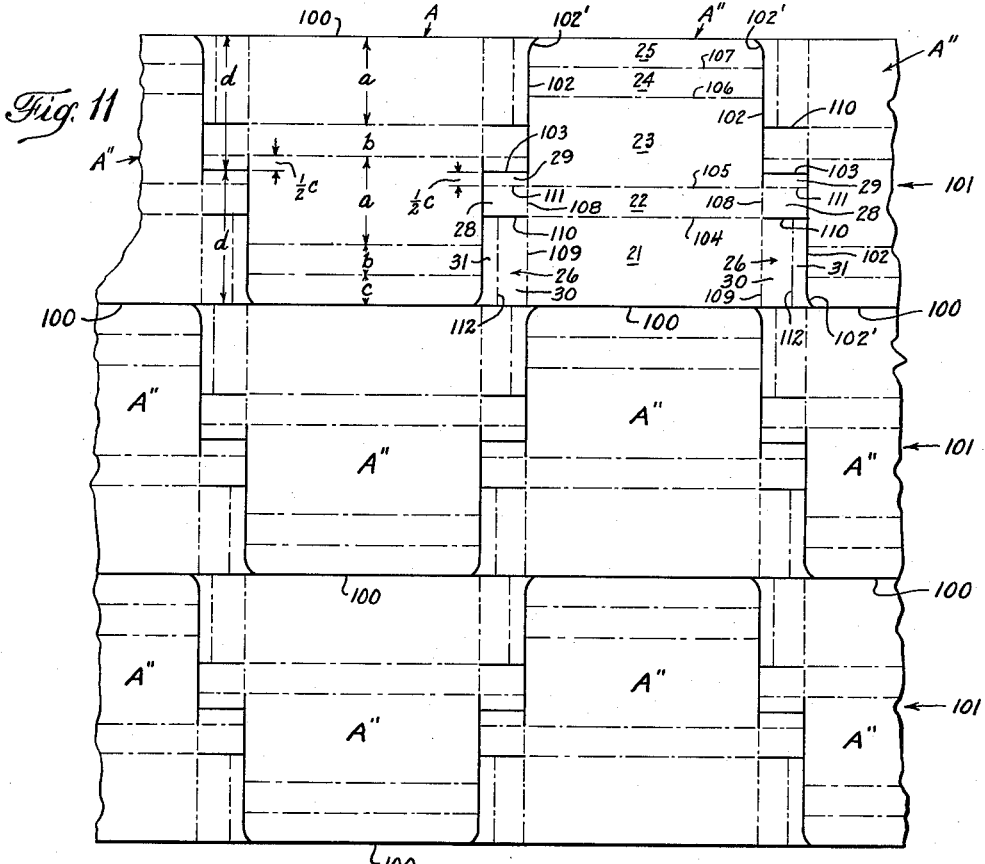
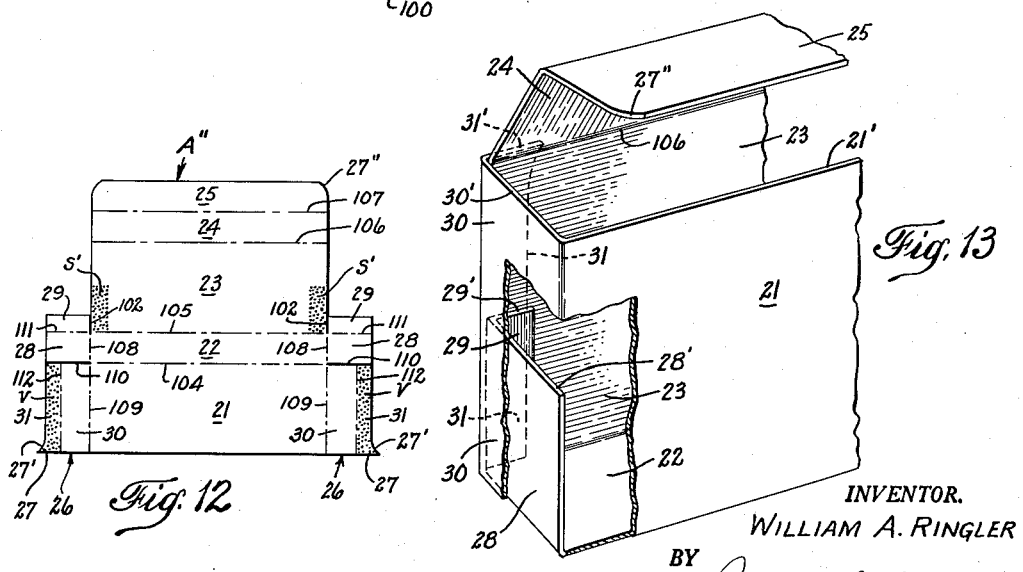
INVENTOR.
WILLIAM A. RINGLER
BY Reuben J. Carlson
ATTORNEY.

Oct. 10, 1961 W. A. RINGLER 3,003,675
HINGED COVER BLANKS AND CARTONS
Filed March 8, 1954 6 Sheets-Sheet 5
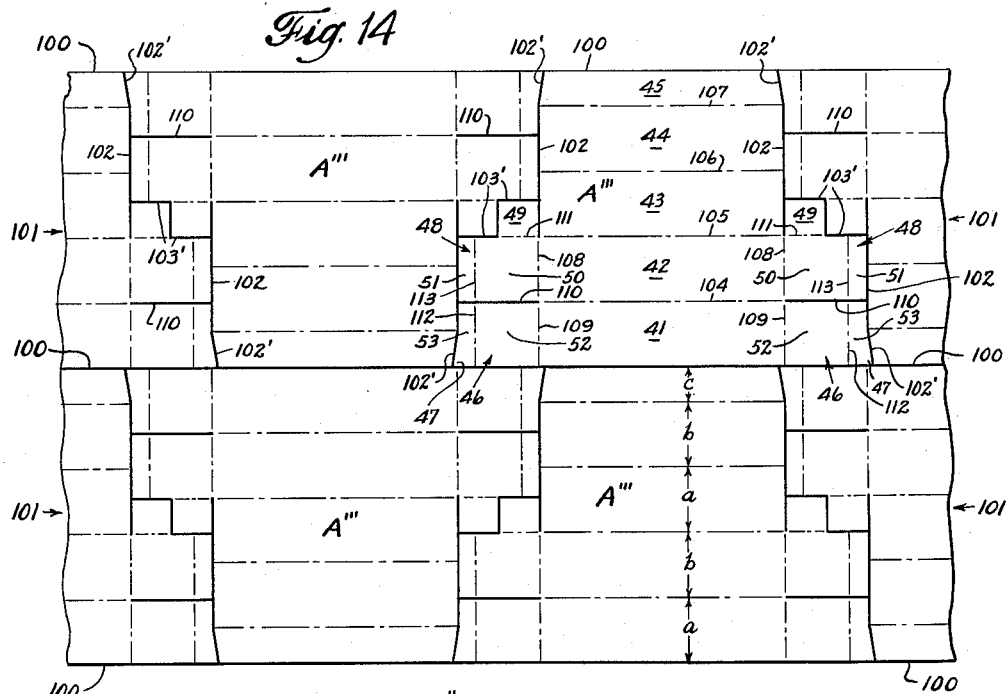
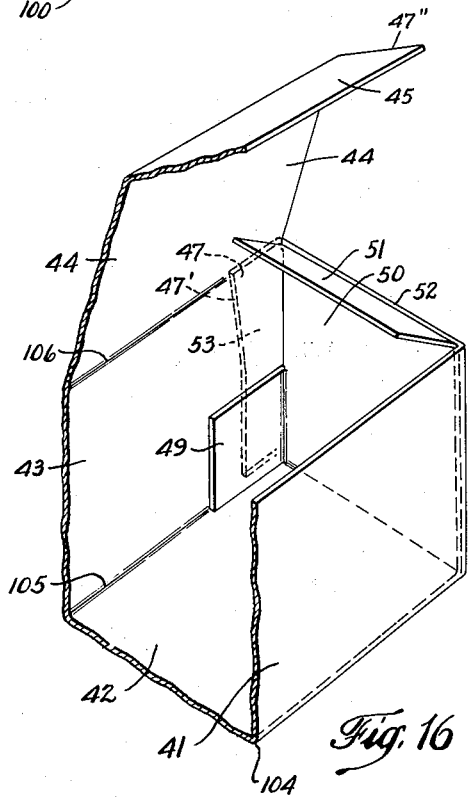
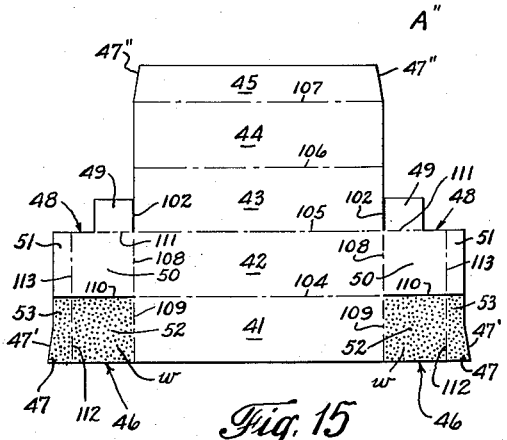
INVENTOR.
WILLIAM A. RINGLER
BY Reuben J. Carlson
ATTORNEY.

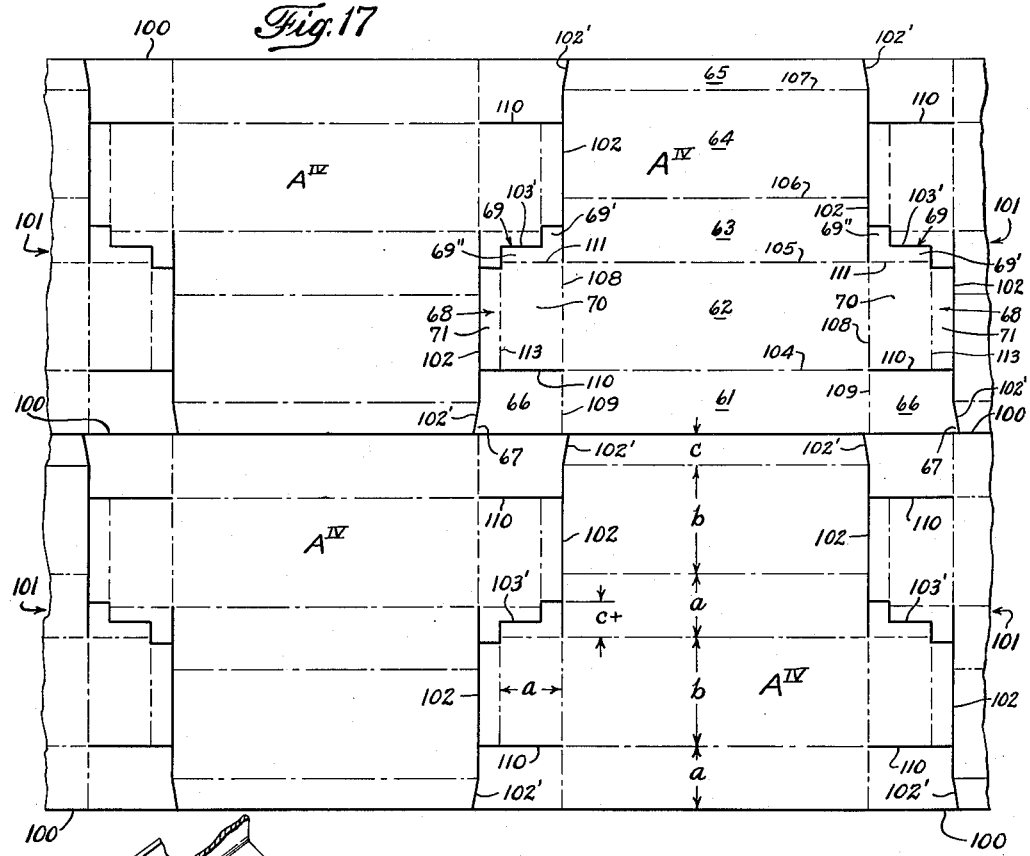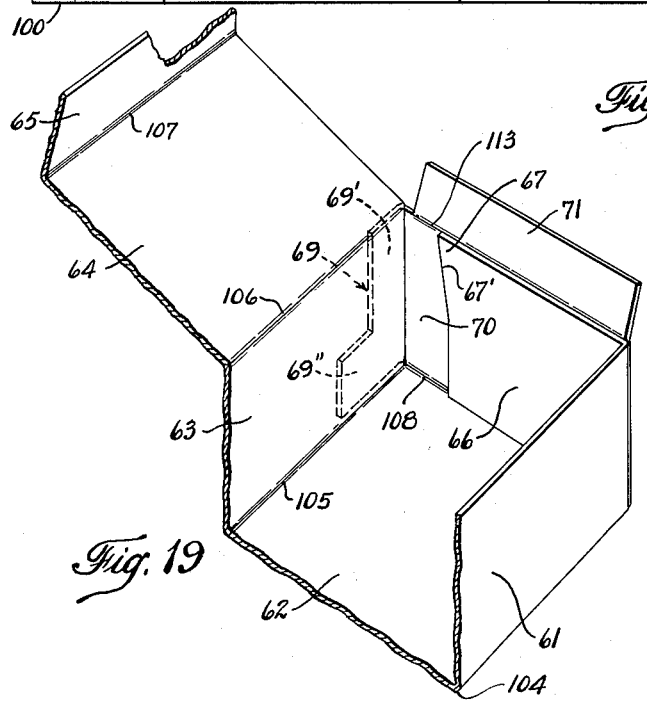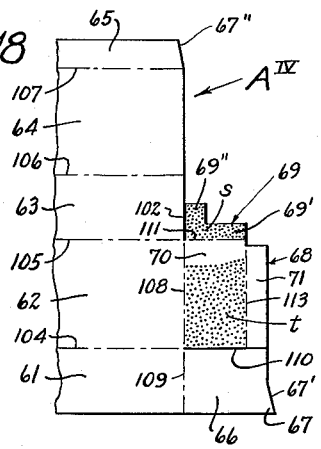

3,003,675
HINGED COVER BLANKS AND CARTONS
William A. Ringler, Wayne, Pa., assignor, by mesne assignments, to Diamond National Corporation, a corporation of Delaware
Filed Mar. 8, 1954, Ser. No. 414,629
14 Claims. (Cl. 229—33)

This invention relates to hinged cover blanks and cartons and more particularly to hinged cover cartons and carton forming blanks which are so formed that the marginal boundaries of adjacent blanks will snugly interfit with no resultant waste therebetween when cut from the stock sheet or stock roll.

Hinged cover cartons formed from paperboard, fiberboard and like sheet materials are extensively used for the packaging of numerous different types and kinds of merchandise. Hinged cover cartons are commonly made of one-piece blanks which present a front wall panel, a bottom wall panel, a rear wall panel, a cover or top wall panel and a tuck-in flap foldably connected by parallel extending scores to provide a carton body of rectangular cross-section of any desired length, width and height. The end walls are customarily formed by end wall forming flaps foldably connected to the ends of the bottom, front and rear wall panels and adhesively secured together in overlapped relationship.

Hinged cover cartons have heretofore been formed from blanks which are so shaped as to inevitably result in substantial waste of stock sheet material between adjacent boundaries of adjacent blanks as cut from the stock sheet. These stock sheet losses have resulted from inability to interfit the end wall forming flaps of adjacent blanks as cut from the stock sheet and from the necessity of providing the tuck-in flaps with rounded or tapered ends which do not interfit with any part of the adjacent blank. Also, the end wall forming flaps associated with the ends of the front, bottom and rear wall panels have been so shaped as to leave stock sheet waste therebetween. Nor has any way been found to shape the hinged cover carton forming blanks so that the side edges of the blanks can be placed in columnar alignment, without leaving an excessive amount of stock sheet waste along the sides of the stock sheet. As a result, stock sheet waste is not only produced between adjacent boundaries of adjacent blanks, but additional stock sheet waste is produced along the side edges of the stock sheet due to the fact that the blanks are not in columnar alignment.

The presence of waste segments or islands between the boundaries of adjacent blanks also creates serious waste stripping problems due to the difficulty of removing isolated segments or islands of waste material between the end wall forming flaps or between the adjacent boundaries of adjacent blanks. To facilitate the stripping operation, it has been customary to leave sufficient space between the boundaries of adjacent blanks so that the otherwise isolated islands or segments of waste material are interconnected by strip waste, but the stripping operation can thereby be facilitated only at the expense of producing additional stock sheet waste.

In accordance with this invention, hinged cover carton blanks, designed to provide sturdy and attractive hinged cover cartons, may be formed with no resultant waste of stock sheet material between the boundaries of adjacent blanks, and no waste stripping operation is required. These blanks are patterned on the stock sheet in columnar rows by longitudinally extending parallel cuts which define both side margins of a column of aligned blanks. Thus the distance between the longitudinally extending cuts is equal to the overall width of a single blank, i.e. the combined width of the front panel, bottom panel, rear panel, top panel and tuck-in flap as foldably connected by longitudinally extending parallel scores. As thus patterned, alternate blanks in each columnar row present the side edge of the front panel and the side edges of the associated front end flaps in alignment with each other and in alignment with the side edge of the tuck-in flap of the adjacent blank.

The carton blanks in each columnar row are also shaped and patterned so that the end margin of one blank wil snugly interfit with the adjacent end margin of a similar blank. The interfitted end margins of adjacent blanks are separated by a pair of longitudinally spaced slit cuts extending transversely of the columnar strip and substantially parallel to one another. The length of each transverse cut is equal to the combined width of the tuck-in flap, the top panel and the rear panel so that each transverse cut thereby defines the free end edge of the tuck flap and the top and rear panels of the adjacent blank. A transverse score or scores which are substantially in linear alignment extends from the terminal end of each transverse cut to the longitudinal cut which defines the opposite side edge of the columnar strip. The space between each transverse score and the adjacent transverse cut as longitudinally spaced therefrom provides the material from which the front end flap and the adjacent bottom end flap of the blank are formed. Each front end flap is separated from the adjacent bottom end flap by a segmental slit cut which extends from and substantially in alignment with the front panel and bottom panel connecting score to the adjacent transverse cut, so that no stock sheet waste is formed between adjacent front and bottom end flaps.

Each pair of longitudinally spaced transverse cuts present the inner ends thereof in overlapped relation. Assuming a carton of rectangular cross section is formed having the front and rear panels of equal height and the bottom and top panels of equal width, the extent of the overlap of the inner ends of the paired transverse cuts will approximately equal the width of the tuck-in flap. The material between the overlapped end portions of the transverse cuts is employed to form two rear flaps associated with the adjacent reversably positioned blanks. The adjacent rear flaps of adjacent blanks are separated from each other by a segmental cut which connects the paired transverse cuts at a point spaced from the terminal ends thereof. Each rear flap is foldably connected to the rear edge of the adjacent bottom end flap by a segmental score substantially in alignment with the bottom panel and rear panel connecting score of the associated blank. The segmental cuts which separate the adjacent rear flaps of adjacent blanks may be variously shaped to provide a pair of rear flaps of any desired edge contour which interfit with each other as the blanks are cut from the columnar strip. The rear flaps as foldably connected to the rear ends of the bottom end flaps are designed to overlap the inside face or the outside face of the rear panel of the assembled carton, and may be advantageously employed to secure the bottom end flap, forming a part of the end wall of the assembled carton, to the rear panel of the carton.

The outer end portions of the transverse cuts which define the end edges of the tuck-in flap are flared so as to provide the tuck flap with tapered end edges which facilitates its insertion into the erected carton. The tapered ends of the transverse cuts accordingly define correspondingly shaped ear portions which project from the end edges of the front end flaps of adjacent blanks, so that the free edge contour of each ear portion is in reverse conformity to the tapered end edge of adjacent tuck flap. As thus cut, the end margins of the front end flap and bottom end flap of one blank will snugly interfit with adjacent end margins of the tuck flap, top panel and rear panel of adjacent blanks in the columnar row, with the paired rear flaps of adjacent blanks also interfitting with each other. The ear portions projecting from the marginal ends of the front end flaps are wholly unobjectionable since they are overlapped by other parts of the assembled carton and do not project from or otherwise deface the rectangular contour of the assembled carton.

Cartons having any desired length, height and width may be made in accordance with this invention from interfitted blanks which may be scored and cut from a stock sheet or stock roll with no resulting waste of stock sheet material between the adjacent marginal edges of the blanks. The interfitting blanks may be so proportioned as to provide dust flaps in association with the bottom end flaps. The interfittted blanks may also be so proportioned as to provide securing flaps in association with the front end flaps designed for securement to the rear panel of the assembled carton to further strengthen and rigidify the carton structure. Hinged cover tucked flap cartons made from interfitting blanks shaped and formed in accordance with this invention are sturdy in construction, pleasing in appearance and can be made in any desired length, width or height to receive and accommodate many different types of merchandise.

An object of this invention is to provide hinged cover carton forming blanks which are so shaped and formed as to permit high speed scoring and cutting thereof from stock sheets or stock rolls with no resultant waste of stock sheet material between blank boundaries.

Another object of this invention is to provide a series of similar interfitting hinged cover carton forming blanks which can be recovered from a stock sheet or stock roll in aligned columnar rows or strips whose width is equal to the width of a single blank, with the end margins of successive blanks in each columnar strip being separated by single line transversely extending slit cuts only, with the side margins of the blanks which comprise the columnar strip in longitudinal alignment so that the columnar strips are separated by single line cuts only, and with no intervening stock sheet waste between adjacent marginal boundaries of the blanks.

Another object of this invention is to provide carton forming blanks from which hinged cover tuck flap cartons may be erected having dust flaps associated with the end walls thereof, the blanks being so shaped and formed as to permit scoring and cutting thereof from a stock sheet or stock roll with no resultant waste of stock sheet material between blank boundaries.

A further object of this invention is to provide improved hinged cover cartons of rectangular cross section and of any desired length, width or height which are sturdy and strong in construction, attractive in appearance and which are formed from one-piece blanks shaped to permit formation thereof with no resultant stock sheet waste.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which:

FIG. 6 illustrates the manner in which a series of carton forming blanks having bottom, top, front and rear panels of substantially equal width may be scored and cut from a stock sheet or stock roll in accordance with this invention with no resulting waste of stock sheet material between adjacent marginal boundaries of the blanks;

FIG. 7 is a fragmentary plan view showing the manner in which the glue patches may be applied to the inside face of the blanks when scored and cut as shown in FIG. 6;

FIG. 8 is a fragmentary plan view of the carton blank scored and cut as shown in FIG. 6 showing an alternative application of glue patches to the inside face of the blank prior to assembly of the blank into carton form;

FIG. 9 is a perspective view of the carton assembled from the blank when glued as shown in FIG. 7;

FIG. 10 is a fragmentary perspective view of a carton assembled from the blank glued as shown in FIG. 8;

FIG. 11 is a plan view of a fragmentary section of stock sheet or stock roll as it would appear after scoring and cutting to provide a series of carton forming blanks whose bottom and top panels are substantially narrower than the front and rear panels and with no resulting stock sheet waste between adjacent marginal boundaries of the blanks;

FIG. 12 is a plan view of a blank cut and scored as shown in FIG. 11 as it would appear after the glue patches have been applied to the inside face thereof;

FIG. 13 is a fragmentary perspective view of the carton as it would appear when assembled from the glued blank shown in FIG. 12.

Figure 1:
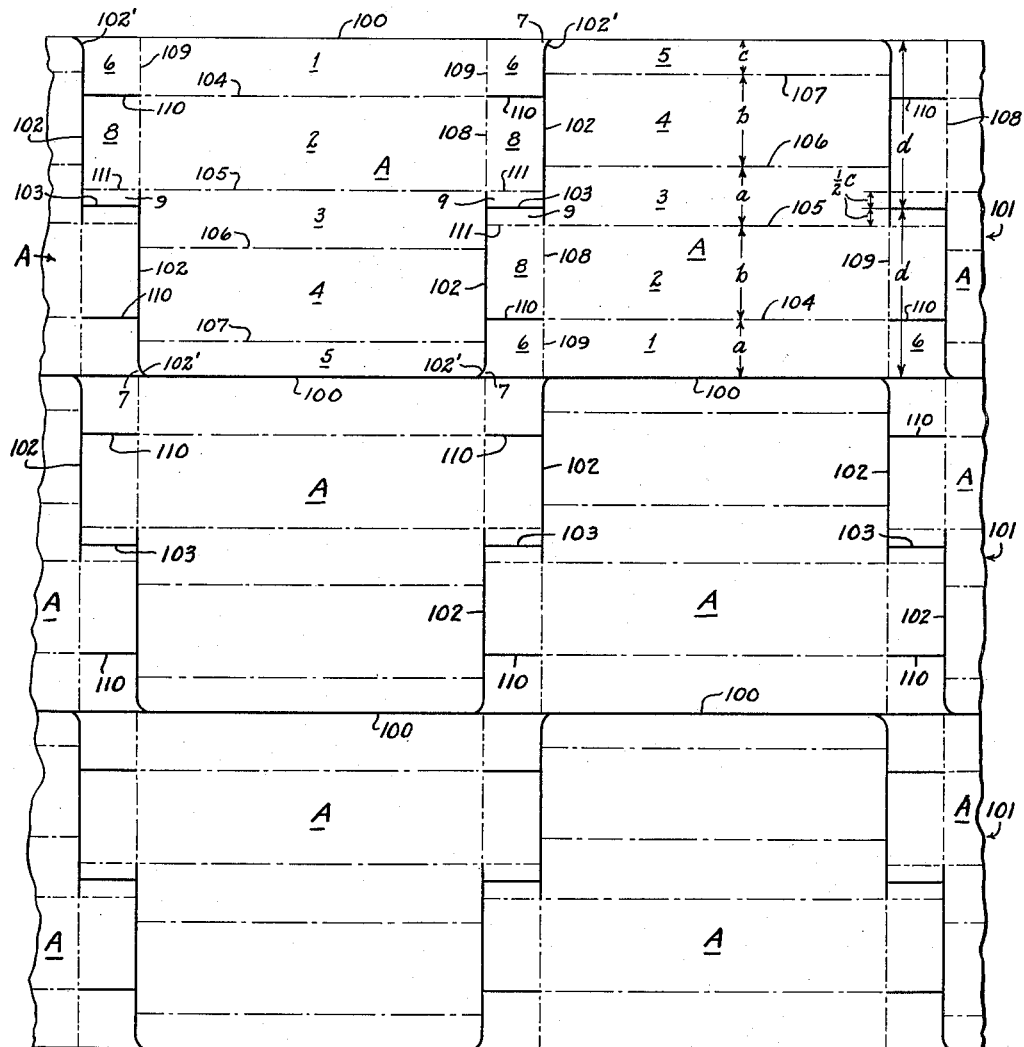
FIG. 1 illustrates a series of carton forming blanks made in accordance with this invention as they would appear when scored and cut from a stock sheet or stock roll on a cutting and scoring machine with no resulting waste of stock material between the marginal boundaries of adjacent blanks.

FIG. 14 is a plan view of a fragmentary section of a stock sheet or stock roll as it would appear after scoring and cutting to provide a series of carton forming blanks arranged in column rows whose bottom end flaps have dust flaps associated therewith and whose front end flaps have rear panel securing flaps associated therewith, the scoring and cutting of the blanks as thus patterned on the stock sheet being accomplished without waste of stock sheet material between the boundaries of adjacent blanks;

FIG. 15 is a plan view of a blank cut and scored as shown in FIG. 14 as it would appear after glue patches have been applied to the inside face of the front end flaps thereof;

FIG. 16 is a fragmentary perspective view of the carton as it would appear when assembled from the glued blank shown in FIG. 15;

FIG. 17 is a plan view of a fragmentary section of a stock sheet or stock roll whose cutting and scoring pattern is so defined as to produce carton forming blanks without resultant waste of stock sheet material between the boundaries of adjacent blanks, and whose blanks are designed to provide dust flaps in association with the bottom end flaps of each blank, with a rear flap hinged to the rear edge of each bottom end flap designed for securement to the rear panel of the carton assembled therefrom;

FIG. 18 is a fragmentary plan view of a blank cut and scored as shown in FIG. 17 and as it would appear after glue patches have been applied to the bottom end flap and rear flap thereof; and FIG. 19 is a fragmentary perspective view of the carton as it would appear when assembled from the glued blank shown in FIG. 18.

Similar reference characters refer to similar parts throughout the several views of the drawings and specification.

FIGS. 1, 1A, 6, 11, 14 and 16 illustrate the scoring and cutting patterns which may be employed in accordance with this invention to produce a series of marginally interfitting blanks and from which hinged cover cartons of varying lengths, widths and depths may be assembled. These blanks are shaped and formed so that the adjacent boundaries of the adjacent blanks are separated by slit cuts only, with no strips or islands between adjacent boundaries of adjacent blanks which would otherwise have to be stripped and removed as waste stock sheet material. In recovering the blanks, the stock sheet or stock roll is slit cut by one or more parallel cuts 100 which extend longitudinally thereof, thereby defining two or more columnar strips 101, each having a width equal to the overall width of the flattened carton forming blank. The longitudinally extending cuts 100 thereby define the side edges of a single row of aligned blanks as cut from the columnar strip.

The ends of the blanks in each columnar strip are separated from each other by a pair of transverse slit cuts 102 which extend from the opposite side margins 100 of the columnar strip inwardly for a distance substantially equal to the combined width of the tuck flap, top panel and rear panel of the adjacent blank, so that each transverse cut 102 defines the end margins of the adjacent tuck flap, top panel and rear panel. The inner terminal ends of the paired transverse cuts 102 thus extend slightly beyond the longitudinal center line of the columnar strip and overlap each other for a distance substantially equal to the width of the tuck flap. The paired transverse cuts are substantially in parallelism and extend at right angles to the longitudinal cuts 100, except that their outer terminal ends 102' flare in opposite directions adjacent their points of intersection with the longitudinal cuts 100 to thereby define the tapered end margins of the adjacent tuck flaps. The paired transverse cuts 102 are joined by a generally longitudinal extending segmental cut which may be of any desired configuration, but which is substantially confined between the overlapping inner ends of the paired transverse cuts 102, and lies between the bottom and rear panel connecting score of one blank and the bottom and top panel connecting score of the adjacent blank in the columnar strip. The segmental connecting cuts may be of any desired configuration, but preferably are either in the form of a straight line cut 103 which substantially coincides with the longitudinal center line of the columnar strip as shown in FIGS. 1, 6 and 11, or in the form of a Z-shaped cut 103' as shown in FIG. 14, or in the form of a double-Z-shaped cut 103" as shown in FIG. 17.

As thus cut, the adjacent blanks in each columnar strip are in alternately reversed position as shown in FIGS. 1, 1A, 6, 11, 14 and 17, so that the adjacent end margins of adjacent blanks are separated only by the paired transverse cuts 102 and their flared continuations 102' and by the segmental connecting cut 103, 103' or 103". No strips or islands of stock sheet material therefore remain between the end margins of adjacent blanks in the columnar strip of stock sheet material. The blanks as cut from adjacent columnar strips 101 are separated by the longitudinally extending single line cuts 100 only, so that there are no islands or strips of stock sheet material between the blanks as recovered from adjacent columnar stock sheet strips.

The number of blank-containing columnar strips which can be cut from the stock sheet or stock roll depends upon the overall width of the stock sheet or roll, as well as the width of the columnar strips as determined by the overall width of the columnar arranged blanks to be cut therefrom. It will therefore be appreciated that the stock sheets or rolls are preferably made in such widths as to permit the cutting of a convenient number of columnar strips of the required blank forming width, with a minimum amount of side trimming of the stock sheet. Since the outer side edges of the outermost columnar strips are straight and extend longitudinally of the stock sheet or roll, the waste side edge strips will be substantially uniform in width, and by making the stock sheets or rolls in appropriate widths, side trimming may be strictly limited to that required to remove damaged side edges of the stock sheet which would be unsuitable for incorporation into carton blanks. As a result, the very maximum number of hinged cover carton forming blanks may be cut from stock sheets and stock rolls of selected widths, with side stripping strictly limited to the removal of damaged stock sheet edges only, and with no resultant stock sheet waste being produced between adjacent boundaries of adjacent blanks which require removal.

In addition to the savings in stock sheet material and the elimination of the costly stripping operation which can be effected by the practice of this invention, the cutting and scoring operation may also be effected at substantially higher production speeds since there are no loose waste strips or islands which often clog the cutting and scoring mechanism, and which requires running of the cutting and scoring machine at substantially below its capable speed of operation. As a further advantage, the columnar strips can be completely separated from each other by the longitudinal cuts 100, and the adjacent blanks can also be fully separated from each other by the paired transverse cuts 102 and 102' and the connecting segment cuts 103, 103' or 103", so that all the blanks produced are fully separated as they leave the cutting and scoring machine, and are all in usable form, so that the blank losses which have heretofore resulted from careless stripping of waste stock material is also saved.

During passage of the stock sheets or stock roll through the cutting and scoring machine, scores and cuts are also applied to the blank patterns to complete the formation of the carbon blanks. As shown in FIGS. 1, 1A, 6, 11, 14 and 17, four longitudinal extending and parallel scores 104, 105, 106 and 107 are applied to each blank pattern which respectively define the front panel, the bottom panel, the rear panel, the top panel, and the tuck-in flap of the blank. All of the scores 104, 105, 106 and 107 are substantially parallel to one another and extend longitudinally of the columnar strip 101 from which the blanks are cut. A pair of transversely extending and substantially parallel scores 108, and a pair of substantially parallel transversely extending scores 109, are also applied to each blank pattern which define the bottom end flaps and the front end flaps respectively. The adjacent transverse scores 108 and 109 are substantially in alignment with each other, are also substantially in alignment with one of the paired transverse cuts 102, and are additively substantially parallel to the companion transverse cut 102.

A longitudinally extending segmental cut 110, which is substantially in alignment with the longitudinal score 104, separates the front end flap from the adjacent bottom end flap of each blank. A pair of longitudinal extending segmental scores 111, which are substantially in alignment with the longitudinally extending bottom and rear panel connecting score 105 of each blank, define the rear edge of the bottom end flaps to which a rear flap is foldably connected. The longitudinal scores 104, 105, 106 and 107, the longitudinal segmental scores 111, the longitudinal segmental cuts 110 and the transverse scores 108 and 109, are applied to the stock sheet or stock roll during its passage through the cutting and scoring machine and substantially simultaneously with the application of the cuts which define the marginal outlines of the blanks, namely, the parallel extending longitudinal cuts 100, the paired transverse cuts 102 and their associated flared end cuts 102′, and the longitudinally extending segmental cuts 103 or 103′ or 103″.

While all of the blank patterns A, A′, A″, A‴ and Aⁱᵛ as shown in FIGS. 1 and 1A, FIG. 6, FIG. 11, FIG. 14 and FIG. 17 respectively, incorporate the cuts and scoring as above described, the spacing of the scores and cuts are nevertheless closely inter-related Thus, the longitudinal score 104 and the segmental cuts 110 are spaced a distance $a$ from the adjacent longitudinally extending strip defining cut 100, which distance $a$ is substantially equal to the distance $a$ between the parallel longitudinally extending scores 105 and 106 which define the sides of the rear panel. Each longitudinal score 105, and the segmental scores 111 in alignment therewith, are also spaced a distance $b$ from the adjacent longitudinal score 104 and the segmental cuts 110 in alignment therewith, and this distance $b$ is also substantially equal to the distance between the longitudinally extending parallel scores 106 and 107 which define the side edges of the top panel of the blank. Also the distance between adjacent longitudinally extending segmental scores 111 of adjacent blanks is substantially equal to the distance $c$ between the longitudinal score 107 and adjacent longitudinally extending cut 100 between which the tuck-in flap is defined. The blank section defined between the adjacent segmental scores 111 and the inner ends of the adjacent transverse cuts 102, is divided into two portions, by the segmental connecting cut 103 or 103′ or 103″ to provide a pair of rear flaps for the adjacent blanks which are preferably similar in size and shape.

Figure 1A:
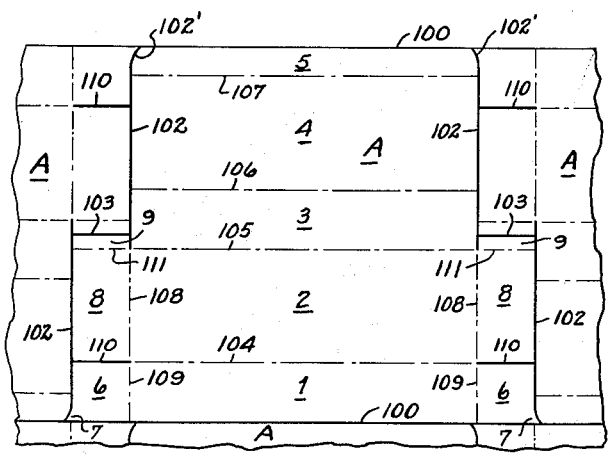
FIG. 1A shows a fragmentary section of the stock sheet scored and cut to provide carton forming blanks which have somewhat wider top and bottom panels than the carton blank shown in FIG. 1, and which may also be cut from a stock sheet or stock roll with no resultant waste between the marginal boundaries of adjacent blanks.

By inter-relating the scoring and slit cut spacings as above described, a series of variously dimensioned but similar hinged cover carton-forming blanks may be recovered from the stock sheets or stock rolls without resulting stock sheet waste between adjacent boundaries of the blanks, and from which similar hinged cover cartons of rectangular contour can be made having almost any desired length, width and height. For example, the scoring and cutting pattern as shown in FIG. 1 and FIG. 1A produces similar blanks A from which similar cartons can be made having any desired length, but whose width is greater than their height. Thus the blanks A each present a relatively low front panel 1 foldably connected by the longitudinal score 104 to a relatively wide bottom panel 2, the bottom panel 2 being foldably connected by the longitudinal score 105 to the rear panel 3 which is substantially the same width as the front panel 1, and the rear panel 3 being foldably connected by the longitudinal score 106 to the top panel 4 which is substantially the same width as the width of the bottom panel 2, with the tuck-in flap 5 foldably connected to the top panel 4 along the longitudinal score 107.

The similar front end flaps 6 of each blank A are foldably connected to the ends of the front panel 1 along the parallel extending transverse scores 109, and the similar bottom end flaps 8 are foldably connected to the ends of the bottom panel 2 by the parallel transversely extending scores 108. The width of each bottom end flap 8 as defined between the longitudinally extending segmental cut 110 and the adjacent segmental score 111 is substantially equal to the width $b$ of the bottom panel 2, and the width of each front end flap 6 as defined between the segmental cut 110 and the adjacent longitudinal cut 100 is substantially equal to the width $a$ of the front panel 1 and the length of the bottom end flap 8. Each rear panel securing flap 9 of the blank A has its bottom edge separated from the adjacent end of its rear panel 3 by the transverse cut 102, and has a width as defined between the longitudinal connecting cut 103 and the adjacent longitudinal segmental score 111 which is substantially equal to one-half the width of the tuck-in flap 5. The longitudnal length of each rear panel securing flap 9, the adjacent bottom end flap 8, and the adjacent front end flap 6, as defined between the transvesre scores 108— 109 and the transverse cut 102, are substantially the same, except that an ear portion 7 is formed on the end extremity of each front end flap 6 whose edge contour 7′ is defined by the flared end 102′ of the transverse cut 102 which is in reverse conformity to the end contour 7″ of the tuck-in flap 5.

Figure 2:
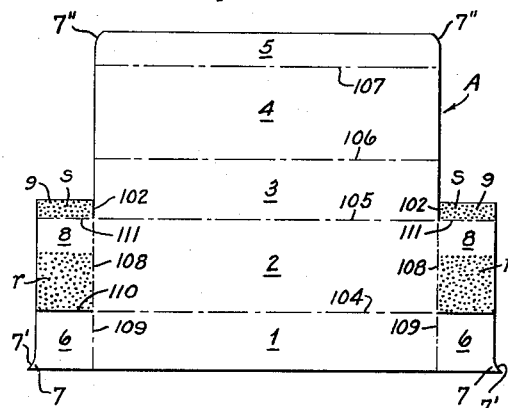
FIG. 2 is a plan view of the carton blank cut and scored as shown in FIG. 1 or FIG. 1A having glue patches applied to the inside face of certain of the end flaps thereof in preparation for its assembly and erection into a carton.
Figure 3:
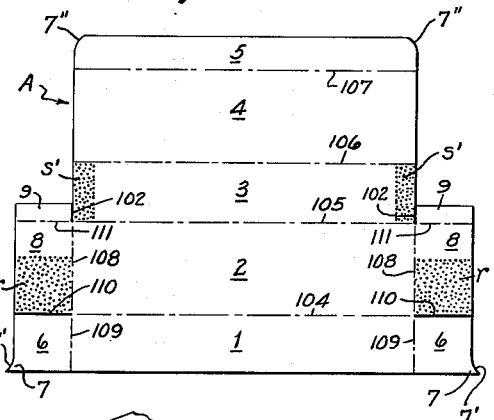
FIG. 3 is a plan view of the carton blank scored and cut as shown in FIG. 1 or FIG. 1A showing an alternate arrangement of the glue patches applied to the inside face of the blank in preparation for its assembly into an erected carton of modified form.
Figure 4:
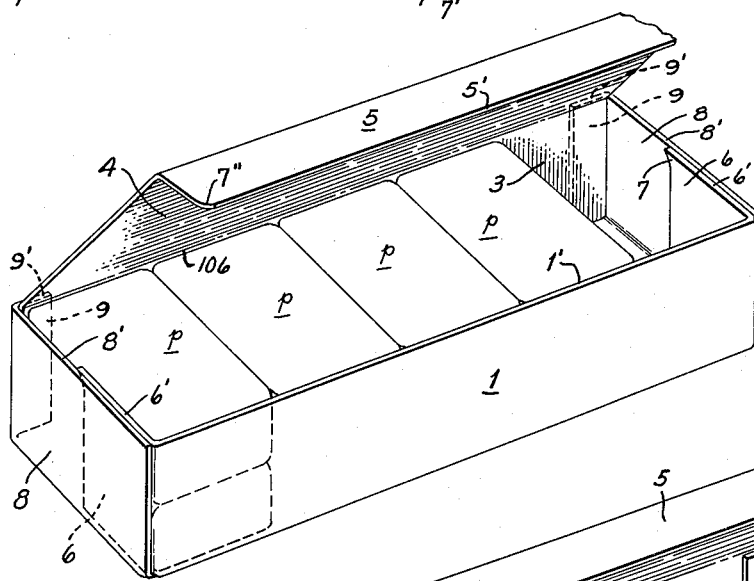
FIG. 4 is a perspective view of the carton as assembled from the glued blank shown in FIG. 2.
Figure 5:
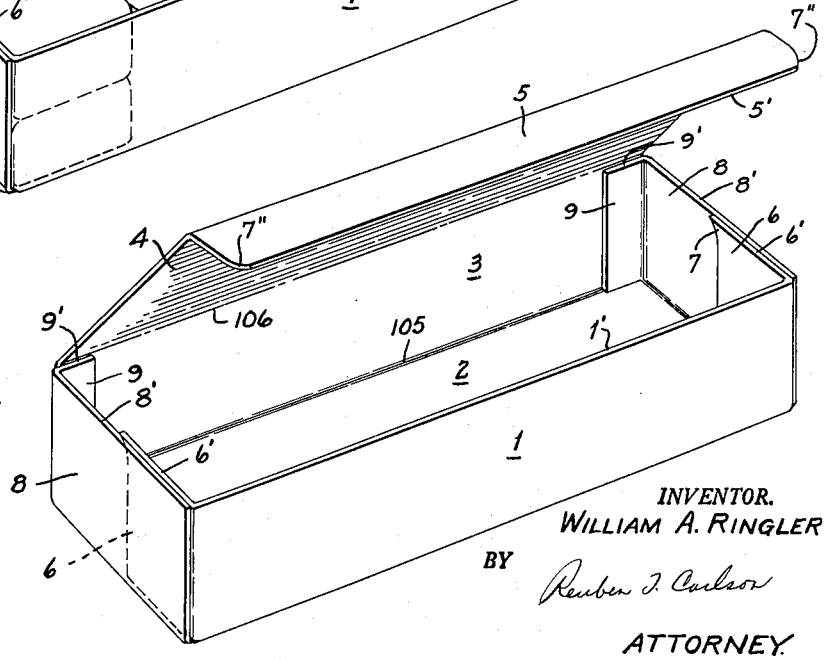
FIG. 5 is a perspective view of the carton as assembled from the glued blank shown in FIG. 3.

The blanks A as removed from the blank pattern shown in FIG. 1 and FIG. 1A will appear as shown in FIGS. 2 and 3. To assemble these blanks into carton form, a patch $r$ of adhesive is applied to the inside face of each bottom end flap 8, the adhesive area conforming to the area of the adjacent front end flap 6. A patch $s$ of adhesive may be applied either to the inside face of each rear end flap 9 as shown in FIG. 2, or a corresponding patch $s'$ of adhesive may be applied to the inside face of the rear panel 3 as shown in FIG. 3. The blanks A as shown in FIGS. 2 and 3 may be erected into carton form on standard carton assembly equipment by erecting the front panel 1, rear panel 3 and end panels 8, and pressing the front end flaps 6 into adhesive securement with the inside face of the adjacent erected bottom end flap 8. Each rear panel securing flap 9 may be secured either to the outside face of the rear panel 3 to provide an erected carton as shown in FIG. 4, or the rear panel securing flaps 9 may be secured to the inside face of the rear panel 3 to provide the erected carton as shown in FIG. 5.

In forming cartons from blanks A whose bottom panel 2 is wider than the height of the front panel 1 and rear panel 3, the transverse cuts 102 which define the ends of the blank patterns are so spaced as to place the top edge 8′ of the end panel forming flaps 8 of the erected carton substantially in alignment with the top edge 1′ of the front panel 1 as defined by the longitudinal cut 100 of the blank pattern. The top edge 6′ of the front end flaps 6 of the erected carton, as defined by the longitudinal cut 100 in the blank pattern, will also be substantially in the plane of the top edge 1′ of the front panel 1. Similarly the top edge 9′ of the erected rear panel securing flaps 9, as defined by the transverse cuts 102 in the blank pattern, will be substantially in the plane of the top panel hinging score 106.

The ear portions 7 projecting from the ends of the front panel flaps 6 will lie flat against the inside face of the bottom end panels 8 of the erected carton, and are substantially invisible when articles of merchandise $p$ are packed in the box part, and the tapered or rounded ends 7″ of the tuck-in flap 5 permit ready insertion thereof into the carton. In the carton formed as shown in FIGS. 4 and 5, it will be appreciated that the parallel scores 109 which define the front end flaps 6 may be slightly inset with respect to the transverse scores 108 which define the bottom end panels to an extent sufficient to compensate for blank sheet thickness and to facilitate infolding of the front end flaps 6 to overlie the end panels 8. Similarly, the scores 111 which define the rear panel securing flaps 9 may be slightly offset with respect to the longitudinal score 105 to compensate for sheet thickness and to facilitate securement of the flaps 9 to either the outside face or the inside face of the rear panel 3. Such incremental offsetting of the scores to compensate for sheet thickness and facilitate erection of the blank into carton form, in no way affects the patterned interfit of the blanks as shown in FIG. 1.

Hinged cover cartons having any desired length, but whose height is substantially equal to their width, may be formed from blanks A′ patterned as illustrated in FIG. 6. Each of the blanks A′ present a front panel 11, a bottom panel 12, a rear panel 13, and a top panel 14, foldably connected in series arrangement by the longitudinal scores 104, 105 and 106, with a tuck-in flap 15 foldably connected to the top panel 14 along the longitudinal score 107. Each of the blanks A′ patterned as shown in FIG. 6 has its front panel 11 of a width $a$ which is substantially equal to the width $a$ of its rear panel 13, and the width $a$ of the front and rear panels 11 and 13 are in turn substantially equal to the width $b$ of the bottom panel 12 and the top panel 14.

Similar front end flaps 16 are foldably connected to the ends of the front panel 11 of blank A' along the substantially parallel transversely extending scores 109, similar bottom end flaps 18 are foldably connected to the ends of the bottom panel 12 along the transversely extending and substantially parallel scores 108, and similar rear panel securing flaps 19 are foldably connected to the rear edges of the bottom flaps 18 by the longitudinally extending segmental scores 111 which are substantially in alignment with the bottom panel and rear panel connecting score 105. The combined width $d$ of the front end flap 16, the adjacent bottom end flap 18 and the adjacent rear panel securing flap 19 is substantially equal to one-half of the total width of the blank A', and is substantially equal to the width $a$ plus the width $b$ plus one-half the width $c$ of the tuck-in flap 16.

The longitudinal length of each rear panel securing flap 19, the adjacent bottom end flap 18 and the adjacent front end flap 16, as defined between the transverse scores 108—109 and the transverse cut 102, are substantially the same, except that an ear portion 17 is formed on the end extremity of each front end flap 16 whose edge contour 17' is defined by the flared end 102' of the transxerse cut 102 which is in reverse conformity to the end contour 17" of the tuck-in flap 15. The transverse cut 102 and its associated flared end 102' is so spaced with respect to the front end flap hinging score 109 as to make the over-all length of the side edge of each front end flap 16 and its associated ear portion 17, as defined by the longitudinal cut 100, substantially equal to the width of the bottom panel. The width of each bottom end flap 18 of blank A', as defined between the segmental cut 110 and the segmental score 111, is substatnially equal to the width of the bottom panel 12, but the longitudinal length of each bottom end flap 18 as measured between the transverse score 108 and the transverse cut 102 is slightly less than the width of the front panel 11.

In assembling the blanks A' into carton form, the inside face of each front end flap 16 is covered with a patch of adhesive $t$ as shown in FIGS. 7 and 8. A patch of adhesive $s$ is applied either to the inside face of each rear panel securing flap 19 as shown in FIG. 7, or a corresponding patch of adhesive $s'$ may be applied to the inside face of the rear panel 13 as shown in FIG. 8. The glued blanks A' as shown in FIGS. 7 and 8, may be assembled into carton form as shown in FIGS. 9 and 10 on standard carton assembly equipment. Cartons assembled from blanks A', whose front and rear panels have a height substantially equal to the width of the bottom panel, would each have the top edge 16' of its front end flaps 16 substantially in alignment with the top edge 11' of its front panel 11, while the top edge 18' of its bottom end flaps 18 would be slightly below the top edge 16' of the overlying front end flaps 16 as shown in FIGS. 9 and 10. The top edge 19' of the rear panel securing flaps 19 would also fall just slightly below the top panel hinging score 106. The top edge 16' of each outer end wall forming flap 16 nevertheless extends across the full width of the carton and thus defines the top edge of the carton end wall, but the tip end of its ear portion 17 does not extend beyond the outside face of the rear panel 13 so that the carton is not defaced thereby.

The transverse scores 109 which define the front end flaps 16 may be incrementally offset outwardly from the transverse scores 108 which define the bottom end flaps 18, to thereby compensate for blank thickness and to facilitate folding of the front end flaps 16 to overlie the adjacent bottom end flap 18. Similarly, the longitudinally segmental scores 111 may be slightly offset with respect to the longitudinal score 105 to compensate for blank thickness and to facilitate securement of the rear panel securing flap 19 either to the outside face or the inside face of the rear panel 13 as shown in FIGS. 9 and 10. The offsetting of the longitudinal and transverse scoring as above described in no way affects the snug innerfit between the marginal boundaries of the blanks A', as illustrated in the blank pattern of FIG. 6. By following the principles of this invention, hinged cover cartons of any desired length, but having substantially square shaped end walls, may be produced which are strong in construction and attractive in appearance, without resulting waste between adjacent boundaries of the blank pattern.

Hinged cover cartons having any desired length, but whose height is greater than their width, may be formed from blanks A" patterned as illustrated in FIG. 11. Each of the blanks A" present a front panel 21, a bottom panel 22, a rear panel 23, and a top panel 24, foldably connected in series arrangement by the longitudinal scores 104, 105 and 106, with a tuck-in flap 25 foldably connected to the top panel 24 along the longitudinal score 107. Each of the blanks A" has its front panel 21 and rear panel 23 of substantially the same width $a$ and has its bottom panel 22 and its top panel 24 of substantially the same width $b$, but the width $a$ of the front and rear panels 21 and 23 is greater than the width $b$ of the bottom and top panels 22 and 24.

The blank A" has similar front end flaps 26 foldably connected to the ends of the front panel 21 along the substantially parallel transversely extending scores 109, similar bottom end flaps 28 foldably connected to the ends of the bottom panel 22 along substantially parallel transversely extending scores 108, and similar rear panel securing flaps 29 foldably connected to the rear edges of the bottom flaps 28 by the longitudinally extending segmental scores 111 which are substantially in alignment with the bottom panel and rear panel connecting score 105. The combined width $b$ of the front end flap 26, the adjacent bottom end flap 28 and the adjacent rear panel securing flap 29 is substantially equal to one-half of the total width of the blank A", and is substantially equal to the width $a$ plus the width $b$ plus one-half the width $c$ of the tuck-in flap 25.

In the blank A", the longitudinal length of each rear panel securing flap 29, the adjacent bottom end flap 28 and the adjacent front end flap 26, as defined between the transverse scores 108—109 and the transverse cut 102, are substantially the same, except for the ear portion 27 formed on the end extremity of each front end flap 26 whose edge contour 27' is defined by the flared end 102' of the transverse cut 102 which is in reverse conformity to the end contour 27" of the tuck-in flap 25. The width of each front end flap 26 as defined between the segmental cut 110 and adjacent longitudinally extending cut 100 is substantially equal to the width of the front panel 21, but the length of each front end flap 26 is somewhat greater than the width $b$ of the bottom panel 22. Thus each end flap 26 of the blank A" provides a full height and full width end wall section 30 which is defined by a transfer score 112 extending parallel to the adjacent transfer score 109 so that the distance between the transfer scores 109 and 112 is substantially equal to the width of the bottom panel 22. The remaining part of each front end flap 26 extending between the transfer score 112 and the end edge thereof, as defined by transverse cut 102 and its flared end 102', provides a secondary rear panel secured flap 31 whose width is substantially equal to the width of the rear panel 23. Since the length of the rear panel secured flap 29 may be substantially less than the width of the rear panel 23, the secondary rear panel securing flap 31 provides a strong connection between the end panel section 30 and the rear panel 23.

In assembling the blanks A" into carton form, a patch of adhesive $v$ as shown in FIG. 12 is applied to the inside face of each secondary rear panel securing flap 31, and a patch of adhesive $s'$ corresponding to the area of the rear panel securing flap 29 may be applied to the inside face of the rear panel 23 adjacent each end thereof. The glued blank A″ may be erected into carton form as shown in FIG. 13 on standard carton assembling equipment by upfolding the rear panel 23 and the bottom end flaps 28, inturning the rear panel flaps to overlie the inside face of the rear panel 23, upfolding the front panel 21, inturning the front end flaps 26, and thence infolding the secondary rear panel securing flaps 31 and pressing the same into adhesive securement to the outside face of the rear panel 23.

As thus assembled, the end wall sections 30 of the front end flaps 26 provide full height end walls for the carton with the top edge 30′ thereof substantially in alignment with the top edge 21′ of the front panel 21, and with the top edge 31′ of the secondary rear panel securing flaps 31 substantially in alignment with the top panel hinging score 106. The top edge 28′ of the bottom flaps 28 and the top edge 29′ of the rear panel flaps 29 are positioned somewhat below the top edge 30′ of the adjacent end wall section 30 as shown in FIG. 13, where the carton is formed from a blank A″ whose front and rear panels 21 and 23 are wider than the width of the bottom panel 22. The ear portion 27 associated with each secondary rear panel securing flap 31 overlies the outside face of the rear panel 23 as shown in FIG. 13 and does not detract from the appearance of the finished carton.

The transverse scores 109 which define the front end flaps 26 may be incrementally offset outwardly from the transverse scores 108 which define the bottom end flaps 28, to thereby compensate for blank thickness and to facilitate folding of the end wall sections 30 in overlying relation to the outside face of the adjacent upturned bottom end flaps 28. Similarly, the longitudinal segmental scores 111 may be slightly offset with respect to the longitudinal score 105 to facilitate infolding of the rear panel flaps 29 into overlying relation against the inside face of the rear panel 23. The offsetting of the transverse scores 109 and the longitudinal segmental scores 111, and the application of the transverse scores 112 to the end flaps 26, in no way affects the innerfit between the boundaries of blanks A″ as illustrated in FIG. 11. By following the principles of this invention, hinged covered cartons of any desired length, which are strong in construction and attractive in appearance, and having front and rear panels 21 and 23 of any desired greater height than the width of the bottom panel 22, may be produced without resulting waste between adjacent boundaries of the blank patterns.

The blanks A, A′ and A″ patterned as shown in FIGS. 1, 1A, 6 and 11 show segmental connecting cuts 103 extending longitudinally along the center line of the columnar strip so that the two rear panel attaching flaps defined between the segmental scores 111 are substantially of the same width; each rear flap being substantially equal to one-half the width c of the tuck-in flap. While it is generally desirable to place the segmental cuts 103 so that the adjacent rear panel attaching flaps are of approximately equal width and area, it will be appreciated that the cut 103 may extend diagonally between the adjacent segmental scores 111, or may be other than a straight-line cut, such as a slit cut of irregular or bent contour.

Hinged cover cartons of any desired length, width and height, and having dust flaps associated with the end walls thereof, may be formed from one piece blanks patterned on the stock sheet as illustrated in FIGS. 14 and 17, with no resultant waste of stock sheet material between the adjacent marginal boundaries of the blanks. Cartons equipped with dust flaps whose front and rear panels have a height substantially equal to or greater than the width of the bottom and top panels may be formed from blanks A‴ whose cutting and scoring patterns are illustrated in FIG. 14. Each of the blanks A‴ present a front panel 41, a bottom panel 42, a rear panel 43, and a top panel 44, foldably connected in series arrangement by the longitudinal scores 104, 105 and 106, with a tuck-in flap 45 foldably connected to the top panel 44 along the longitudinal score 107. Each of the blanks A‴ has its front panel 41 and rear panel 43 of substantially the same width $a$ and has its bottom panel 42 and its top panel 44 of substantially the same width $b$. The width $a$ of the front and rear panels 41 and 43 may be substantially equal to or greater than the width $b$ of the bottom and top panels 42 and 44.

The blank A‴ has similar front end flaps 46 foldably connected to the ends of the front panel 41 along the substantially parallel transversely extending scores 109, similar bottom end flaps 48 foldably connected to the ends of the bottom panel 42 along substantially parallel transversely extending scores 108, and similarly rear flaps 49 foldably connected to the rear edges of the bottom flaps 48 by the longitudinally extending segmental scores 111 which are substantially in alignment with the bottom panel and rear panel connecting score 105. The blank section as defined by the adjacent segmental scores 111 and the inner ends of the transverse cuts 102 of the blank patterned as shown in FIG. 14, is separated by the segmental connecting cut 103′ to provide two rear flaps, each hinged as by the segmental score 111 to the rear edge of the bottom end flap 48 of one of the two adjacent blanks. The segmental connecting cut 103′ may be generally Z shaped as shown in FIG. 14, with the legs of the Z cut substantially in alignment with the adjacent segmental scores 111 to thereby make the adjacent rear flaps 49 of adjacent blanks of substantially the same area and complementary in shape.

In the blank A‴, the longitudinal length of each bottom end panel 48 and the adjacent front end flap 46, as defined between the transverse scores 108—109 and the transverse cut 102, are substantially the same, except for the ear portion 47 formed on the end extremity of each front end flap 46 whose edge contour 47′ is defined by the flared end 102′ of the transverse cut 102 which is in reverse conformity to the end contour 47″ of the tuck-in flap 45. The width of each front end flap 46 as defined between the segmental cut 110 and the adjacent longitudinally extending cut 100 is substantially equal to the width of the front panel 41, and the width of each bottom end flap 48 as defined between the segmental cut 100 and the adjacent segmental score 111 is substantially equal to the width of the bottom panel 42 to which it is hinged. However, the length of each bottom end flap 48 as defined between the transverse score 108 and the transverse cut 102 is greater than the width $a$ of the front and rear panels 41 and 43 to provide a dust flap 51 of desired length. Each bottom end flap 48 of the blank A‴ has a transverse score 113 extending substantially parallel to the adjacent transverse score 108 and spaced a distance $a$ therefrom to provide a full height and full width end wall section 50 to which the dust flap 51, as defined between the transverse score 113 and the transverse cut 102, is hinged by the transverse score 113.

The length of each front end flap 46 as defined by the transverse cut 102 and 102′ is also somewhat greater than the width $b$ of the bottom panel 22 so that each end flap 46 of the blank A‴ provides a full height and full width end wall section 52 which is defined by a transverse score 112 extending parallel to the adjacent transverse score 109, so that the distance between the transverse scores at 109 and 112 is substantially equal to the width $b$ of the bottom panel 42. The remaining part of each front end flap 46 extending between the transverse score 112 and the end edge thereof, as defined by the transverse cut 102 and its flared end 102′, provides a secondary rear panel securing flap 53 whose width is substantially equal to the width of the rear panel 43. Since the length of the rear panel flap 49 may be substantially less than the width of the rear panel 43, the secondary rear panel securing flap 53 provides a strong connection between the end panel section 52 and the rear panel 43.

In assembling the blanks A‴ into carton form, a patch of adhesive $w$ as shown in FIG. 15 may be applied to the inside face of each front end flap 46 so as to cover substantially the entire area thereof. The glued blank A''' may be erected into carton form as shown in FIG. 16 on standard carton assembling equipment by upfolding the rear panel 43 and the bottom end flaps 48, inturning the rear panel flaps 49 to overlie the inside face of the rear panel 43, upfolding the front panel 41, inturning the front end flaps 46, and thence infolding the secondary rear panel securing flaps 53 and pressing the same into adhesive securement to the outside face of the rear panel 43.

As thus assembled, the end wall sections 52 of the front end flaps 46 and the end wall sections 50 of the bottom end flaps 48 provide full height and full width double thickness end walls for the carton with the top edge 52' of the front end panel section 52 substantially in alignment with the top edge 41' of the front panel 41 and the dust flap hinging score 113 of bottom end flap 48, and with the top edge 53' of the secondary rear panel securing flaps 53 substantially in alignment with the top panel hinging score 105. The ear portion 47 associated with each secondary rear panel securing flap 53 overlies the outside face of the rear panel 43 as shown in FIG. 16 and does not detract from the appearance of the finished carton.

The transverse scores 109 which define the front end flaps 46 may be incrementally offset outwardly from the transverse scores 108 which define the bottom end flaps 48, to thereby compensate for blank thickness and to facilitate folding of the end wall section 52 in overlying relation to the outside face of the adjacent upturned bottom end flap 48. Similarly, the longitudinal segmental score 111 may be slightly offset with respect to the longitudinal score 105 to facilitate infolding of the rear panel flaps 49 into overlying relation against the inside face of the rear panel 43. The offsetting of the transverse scores 109 and the longitudinal segmental scores 111, and the application of the transverse scores 112 and 113 to the end flaps 46 and 48, with the scores 112 offset with respect to the scores 113 as may be necessary, in no way affects the innerfit between the boundaries of blanks A''' as illustrated in FIG. 14. By following the principles of this invention, hinged cover tuck flap cartons having dust flaps associated with the end walls thereof, and of any desired length, and having front and rear panels 41 and 43 of a height substantially equal to or greater than the width of the bottom panel 42, may be made from blanks A''' patterned as illustrated in FIG. 14, without resulting waste between adjacent boundaries of the blank patterns.

Cartons whose end walls are equipped with dust flaps and whose front and rear panels have a height less than the width of the bottom and top panels, may be formed from blanks A$^{iv}$ whose cutting and scoring patterns are illustrated in FIG. 17. Each of the blanks A$^{iv}$ present a front panel 61, a bottom panel 62, a rear panel 63, and a top panel 64, foldably connected in series arrangement by the longitudinal scores 104, 105 and 106, with a tuck-in flap 65 foldably connected to the top panel 64 along the longitudinal score 107. Each of the blanks A$^{iv}$ has its front panel 61 and rear panel 63 of substantially the same width $a$ and has its bottom panel 62 and its top panel 64 of substantially the same width $b$, but with $a$ of the front and rear panels 61 and 62 is less than the width $b$ of the bottom and top panels 62 and 64.

The blank A$^{iv}$ has similar front end flaps 66 foldably connected to the ends of the front panel 61 along the substantially parallel transversely extending scores 109, similar bottom end flaps 68 foldably connected to the ends of the bottom panel 62 along substantially parallel transversely extending scores 108, and similar rear flaps 69 foldably connected to the rear edges of the bottom flaps 68 by the longitudinally extending segmental scores 111 which are substantially in alignment with the bottom panel and rear panel connecting score 105. The blank section as defined by the adjacent segmental scores 111 and the inner ends of the transverse cuts 102 of the blank pattern as shown in FIG. 17, is separated by a segmental connecting cut 103'' to provide two rear flaps 69, each hinged as by the segmental score 111 to the rear edge of the bottom end flap 68 of one of the two adjacent blanks. The segmental connecting cut 103'' may be shaped in the form of a double Z as shown in FIG. 17, with the terminal legs of the cut extending longitudinally and forming offset continuations of the adjacent segmental scores 111, thereby defining two rear flaps 69 for the adjacent blanks which are substantially the same area and complementary in shape.

In the blank A$^{iv}$, the longitudinal length of each bottom end flap 68 and the adjacent front end flap 66, as defined between the transverse scores 108—109 and the transverse cut 102, are substantially the same, except for the ear portion 67 formed on the end extremity of each front end flap 66 whose edge contour 67' is defined by the flared end 102' of the transverse cut 102 which is in reverse conformity to the end contour 67'' of the tuck-in flap 65. The width of each front end flap 66 as defined between the segmental cut 110 and adjacent longitudinally extending cut 100 is substantially equal to the width of the front panel 61, and the width of each bottom end flap 68 as defined between the segmental cut 100 and the adjacent segmental score 111 is substantially equal to the width of the bottom panel 62 to which it is hinged. However, the length of each bottom end flap 68 as defined between the transverse score 108 and the transverse cut 102 is greater than the width $a$ of the front and rear panels 61 and 63 to provide a dust flap 71 of desired length. Each bottom end flap 68 of the blank A$^{iv}$ has a transverse score 113 extending substantially parallel to the adjacent transverse score 108 and spaced a distance $a$ therefrom to provide a full height and full width end wall section 70 to which the dust flap 71, as defined between the transverse score 113 and the transverse cut 102, is hinged by the transverse score 113.

In the blank A$^{iv}$, the length of each front end flap 66 as defined between the transverse score 109 and the transverse cut 102 and 102' is no greater and usually less than the width $b$ of the bottom panel 62 and the adjacent bottom end flap 68. Accordingly, the rear flap 69 hinged by the segmental score 111 to the rear edge of the bottom end flap, is relied upon to secure the end panel section 70 to the rear panel 63. It will be noted that each rear flap 69 is hinged by the segmental score 111 for the full length of the bottom end panel section 70, but its terminal end 69' is substantially in alignment with the adjacent dust flap hinging score 113. The segmental connecting cut 103'' also provides a foot portion for each rear flap 69, whose terminal edge 69'' is offset or inclined with respect to the adjacent segmental score 111 of the adjacent blank so as to taper the inner end of the dust flap 71 or make the dust flap slightly less than the width of the bottom end panel 70. The rear panel securing flaps 69 may be adhesively secured to either the outside face or the inside face of the rear panel 63 to provide a strong connection between the bottom end panel section 70 and the rear panel 63.

In assembling the blanks A$^{iv}$ into carton form, a patch $s$ of adhesive as shown in FIG. 18 may be applied to each rear panel securing flap 69 so as to cover substantially the entire area thereof, and a patch $r$ of adhesive is also applied to the inside face of each bottom end panel 70 over an area corresponding to the area of the front end flap 66. The glued blank A$^{iv}$ may be erected into carton form as shown in FIG. 19 on standard carton assembling equipment by upfolding the front and rear panels 61 and 63, inturning the front end flaps 66, upfolding the bottom end flaps 68 to overlie the outside face of the inturned front end flaps 66, and thence infolding the rear panel securing flaps 69 and pressing the same into adhesive securement to either the inside or the outside face of the rear panel 63.

As thus assembled, the end wall sections 70 of the bottom end flaps 68 provide full height and full width end walls for the carton, with the top edge 66' of the front end flap 66 substantially in alignment with the top edge 61' of the front panel 61 and the dust flap hinging score 113, and with the top edge 73' of the rear panel securing flaps 73 substantially in alignment with the top panel hinging score 105. The ear portion 67 associated with each rear panel securing flap 73 overlies the adjacent face of the rear panel 63 as shown in FIG. 19 and does not detract from the appearance of the finished carton.

The transverse scores 109 which define the front end flaps 66 may be incrementally offset inwardly from the transverse scores 108 which define the bottom end flaps 48, to thereby compensate for blank thickness and to facilitate folding of the end wall section 70 in overlying relation to the outside face of the adjacent inturned front end flap 66. Similarly, the longitudinal segmental score 111 may be slightly offset with respect to the longitudinal score 105 to facilitate infolding of the rear panel flaps 69 into overlying relation against the face of the rear panel 63. The offsetting of the transverse scores 109 and the longitudinal segmental scores 111, and the application of the transverse scores 113 to the bottom end flaps 68, in no way affects the innerfit between the boundaries of blanks A$^{iv}$ as illustrated in FIG. 17. By following the principles of this invention, hinged cover tuck flap cartons having dust flaps associated with the end walls thereof, and having any desired length, with front and rear panels 61 and 63 of less height than the width of the bottom panel 62, may be made from blanks A$^{iv}$ patterned as shown in FIG. 17, without resulting waste between adjacent boundaries of the blank patterns.

By following the teachings if this invention, hinged cover cartons of rectangular cross-section, and provided with tuck-in flaps designed for convenient insertion within the assembled carton adjacent the inside face of the front panel thereof, and if desired, equipped with dust flaps associated with the end walls of the cartons, can be produced at substantially less cost than cartons of like type as heretofore produced. These cost savings are reflected by the substantial cost savings effected in producing the blanks from which the cartons are made, since the blanks may be scored and cut from imprinted stock sheets or stock rolls with no stock waste being produced between the marginal boundaries of adjacent blanks, which permits operation of the cutting and scoring machine at higher speeds than heretofore considered possible, which requires no hand or mechanical stripping of waste material between the marginal boundaries of adjacent blanks, and wherein the side trimming of the stock sheets or stock rolls can be strictly limited to the removal of damaged side edge portions only.

Hinged cover tuck flap cartons can be assembled from blanks made in accordance with this invention on standard carton-assembly equipment. The carton forming blanks may be scored and cut to produce hinged cover cartons of any desired length, width or height with no resulting stock sheet waste between the boundaries of adjacent blanks, which cartons are strong in construction, attractive in appearance, and serviceable in the packaging of numerous different types and kinds of products and merchandise normally packaged in hinged cover cartons.

While certain novel features of this invention have been disclosed herein and pointed out in the claims, it will be understood that various omissions, substitutions and changes may be made by those skilled in the art without departing from the spirit of this invention.

What is claimed is:

1. A one piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-inflap foldably connected by substantial parallel longitudinally extending scores and serially arranged in the order named, said front panel having a transverse width not substantially less than the width of the bottom panel, said tuck-in flap presenting tapered end edges contoured to facilitate insertion of the tuck-in flap into the assembled carton, end wall forming flaps foldably connected to the ends of each of said front and bottom panels, each of said front end flaps having a longitudinal length greater than the transverse width of said bottom panel, a rear panel flap foldably connected to the rear edge of each of said bottom end flaps by a longitudinal score which is substantially in alignment with the bottom and rear panel connecting score, and an ear portion projecting from the end edge thereof whose free end edge is contoured in reverse conformity to the contour of the tapered end edge of said tuck-in flap, a score extending transversely across each of said front end flaps defining an end panel section whose longitudinal length is substantially equal to the transverse width of the bottom panel and a securing flap section designed to be secured to the rear panel of the assembled carton, the adjacent front end section and bottom end flap when secured together in overlapped relation forming a composite carton end wall which presents a substantially smooth and unbroken outer surface and a continuous and straight top edge in substantial alignment with the adjacent top edges of the erected front and rear wall panels.

2. A one piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantial parallel longitudinally extending scores and serially arranged in the order named, said front and rear panels having a width not substantially less than the width of the bottom panel, said tuck-in flap presenting tapered end edges contoured to facilitate insertion of the tuck-in flap into the assembled carton, end wall forming flaps foldably connected to the ends of each of said front and bottom panels, said front and bottom end flaps being of substantially equal length and having a longitudinal length greater than the transverse width of said bottom panel, a rear panel flap foldably connected to the rear edge of each of said bottom end flaps by a longitudinal score which is substantially in alignment with the bottom and rear panel connecting score, each of said front end flaps having an ear portion projecting from the end edge thereof whose free end edge is contoured in reverse conformity to the contour of the tapered end edge of said tuck-in flap, and a score extending transversely across each of said front end flaps defining an end panel section whose longitudinal length is substantially equal to the transverse width of the bottom panel and a securing flap section designed to be secured to the rear panel of the assembled carton, the adjacent front end section and bottom end flap when secured together in overlapped relation forming a composite carton end wall which presents a substantially smooth and unbroken outer surface and a continuous and straight top edge in substantial alignment with the adjacent top edges of the erected front and rear wall panels.

3. A one-piece hinged cover carton-forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantially parallel longitudinally extending scores and serially arranged in the order named, said front panel having a width substantially equal to the width of said rear panel and said bottom panel having a width substantially equal to the width of said top panel, said front and rear panels being substantially wider than the width of said bottom and top panels, said tuck-in flap presenting tapered end edges contoured to facilitate insection of the tuck-in flap into the assembled carton, an end wall forming flap foldably connected to each end of said bottom panel, a rear panel flap foldably connected to the rear edge of each of said bottom end flaps by a longitudinal score which is substantially in alignment with the bottom and rear panel connecting score, an end wall forming section foldably connected to each end of said front panel and having a longitudinal length substantially equal to the transverse width of said bottom panel and a width substantially equal to the width of the front panel, and a rear panel-securing flap foldably connected to the end of each of said end wall forming sections along a transverse score which is substantially parallel to the end defining score of the front panel, each of said rear panel securing flaps having an ear portion projecting from the end edge thereof whose free end edge is contoured in reverse conformity to the contour of the tapered end edges of said tuck-in flap.

4. A one-piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantially parallel longitudinally extending scores and serially arranged in the order named, said front and rear panels having a width not substantially less than the width of the bottom panel, said tuck-in flap presenting tapered end edges contoured to facilitate insertion of the tuck-in flap into the assembled carton, end wall forming flaps foldably connected to the ends of each of said front and bottom panels and having a longitudinal length greater than the transverse width of said bottom panel, a rear panel flap foldably connected to the rear edge of each of said bottom end flaps by a longitudinal score which is substantially in alignment with the bottom and rear panel connecting score, each of said front end flaps having an ear portion projecting from the end edge thereof whose free end edge is contoured in reverse conformity to the contour of the tapered end edges of said tuck-in flap, a score extending transversely across each of said bottom end flaps defining a bottom end panel section whose longitudinal length is substantially equal to the transverse width of said front panel and a dust flap section foldably connected thereto by said transverse score, and a transverse score extending transversely across each of said front end flaps defining an end panel section whose longitudinal length is substantially equal to the transverse width of the bottom panel and a securing flap section designed to be secured to the rear panel of the assembled carton, the adjacent front end section and bottom end flap when secured together in overlapped relation forming a composite carton end wall which presents a substantially smooth and unbroken outer surface and a continuous and straight top edge in substantial alignment with the adjacent top edges of the erected front and rear wall panels.

5. A one-piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantial parallel longitudinally extending scores and serially arranged in the order named, said front and rear panels having a width not substantially less than the width of the bottom panel, said tuck-in flap presenting tapered end edges contoured to facilitate insertion of the tuck-in flap into the assembled carton, adjacent end wall forming flaps foldably connected to the adjacent ends of each of said front and bottom panels and separated by a slit cut extending substantially in alignment with the front panel and bottom panel connecting score, said front and bottom end flaps being of substantially equal length and having a longitudinal length greater than the transverse width of said bottom panel, a rear panel flap foldably connected to the rear edge of each of said bottom end flaps by a longitudinal score which is substantially in alignment with the bottom and rear panel connecting score, each of said front end flaps having an ear portion projecting from the end edge thereof whose free end edge is contoured in reverse conformity to the contour of the tapered end edge of said tuck-in flap, a score extending transversely across each of said bottom end flaps defining a bottom end panel section whose longitudinal length is substantially equal to the transverse width of said front panel and a dust flap section foldably connected thereto by said transverse score, and a transverse score extending transversely across each of said front end flaps defining an end panel section whose longitudinal length is substantially equal to the transverse width of the bottom panel and a securing flap section designed to be secured to the rear panel of the assembled carton, the adjacent front end section and bottom end flap when secured together in overlapped relation forming a composite carton end wall which presents a substantially smooth and unbroken outer surface and a continuous and straight top edge in substantial alignment with the adjacent top edges of the erected front and rear wall panels.

6. A one-piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantially parallel longitudinally extending scores and serially arranged in the order named, said front panel having a width less than the width of the bottom panel, said tuck-in flap presenting tapered end edges contoured to facilitate insertion of the tuck-in flap into the assembled carton, end wall forming flaps foldably connected to the ends of each of said front and bottom panels, said bottom end flaps having a longitudinal length greater than the transverse width of the front panel, each of such front end flaps having an ear portion projecting from the end edge thereof whose free end edge is contoured in reverse conformity to the contour of the tapered end edges of said tuck-in flap, and a score extending transversely across each of the bottom end flaps defining a bottom end panel section whose longitudinal length is substantially equal to the transverse width of said front panel and a dust flap section foldably connected thereto by said transverse score, the adjacent bottom end section and front end flap when secured together in over-lapped relation forming a composite carton end wall which presents a substantially smooth and unbroken outer surface and a continuous and straight top edge in substantial alignment with the adjacent top edges of the erected front and rear wall panels.

7. A one-piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantially parallel longitudinally extending scores and serially arranged in the order named, said front and rear panels having a width less than the width of the bottom panel, said tuck-in flap presenting tapered end edges contoured to facilitate insertion of the tuck-in flap into the assembled carton, end wall forming flaps foldably connected to each end of each of said front and bottom panels and having a longitudinal length greater than the transverse width of the front panel, each of said front end flaps having an ear portion projecting from the rear edge thereof whose free end edge is contoured in reverse conformity to the contour of the tapered end edges of said tuck-in flap, a score extending transversely across each of the bottom end flaps defining a bottom end panel section whose longitudinal length is substantially equal to the transverse width of said front panel and a dust flap section foldably connected thereto by said transverse score, and a rear panel securing flap foldably connected to the rear end of each of said bottom end panel sections whose terminal end does not extend beyond said transverse score, the adjacent bottom end section and front end flap when secured together in overlapped relation forming a composite carton end wall which presents a substantially smooth and unbroken outer surface and a continuous and straight top edge in substantial alignment with the adjacent top edges of the erected front and rear wall panels.

8. One-piece hinged cover carton forming blanks of identical shape and area having end edges designed to snugly and completely interfit when the blanks are alternately arranged in columnar alignment, each of said blanks presenting a front panel, a bottom panel, a rear panel, a top panel and a tuck flap foldably connected by substantially parallel and longitudinally extending scores and serially arranged in the order named, said tuck flap presenting tapered end edges contoured to facilitate insertion of the tuck flap into the assembled carton, similar end wall flaps foldably connected to the outer ends of said front panel and similar end wall flaps foldably connected to the ends of the bottom panel along parallel extending transverse scores, and rear flaps foldably connected to the rear edges of said bottom end flaps along longitudinal scores which are substantially in alignment with the bottom and rear panel connecting score, each of said front end flaps having similar ear portions projecting from the end edges thereof whose free end edges are contoured in reverse conformity to the contour of the tapered end edges of said tuck flap, each of said bottom end flaps having a longitudinal length greater than the width of said front panel and a score extending transversely across the same thereby defining an end panel section whose longitudinal length is substantially equal to the width of said front panel and a dust flap section extending from said end panel section, the outer edges of the adjacent front end flap, bottom end flap and rear flap of one blank being shaped to snugly and completely interfit with the outer edges of the rear flap, rear panel, top panel and tuck flap of an alternately arranged adjacent blank when the opposite side edges of said blanks are in alignment, the adjacent bottom end section and front end flap of each blank when secured together in overlapped relation forming a composite carton end wall presenting a substantially smooth and unbroken outer surface and a straight and continuous top edge in substantial alignment with the adjacent top edges of the erected front and rear wall panels.

9. One-piece hinged cover carton forming blanks of identical shape and area having end edges designed to snugly and completely interfit when the blanks are alternately arranged in columnar alignment, each of said blanks presenting a front panel, a bottom panel, a rear panel, a top panel and a tuck flap foldably connected by substantially parallel and longitudinally extending scores and serially arranged in the order named, said front and rear panels having a width less than the width of the bottom panel, said tuck flap presenting tapered end edges contoured to facilitate insertion of the tuck flap into the assembled carton, similar end wall flaps foldably connected to the outer ends of said front panel and similar end wall flaps foldably connected to the ends of the bottom panel along parallel extending transverse scores, and similar rear flaps foldably connected to the rear edges of said bottom end flaps along longitudinal scores which are substantially in alignment with the bottom and rear panel connecting score, each of said front end flaps having ear portions projecting from the end edges thereof whose free end edges are contoured in reverse conformity to the contour of the tapered end edges of said tuck flap, the outer end edges of adjacent bottom and front end flaps at the end of the blank being substantially in alignment with each other and parallel to the outer end edges of the adjacent bottom and front end flaps at the other end of the blank except for the reversely contoured end edges of the ear portions extending from said front end flaps, a slit cut extending substantially in alignment with the front and bottom panel connecting score separating the adjacent front and bottom end flaps, each of said bottom end flaps having a longitudinal length greater than the width of said front panel and a score extending transversely across the same thereby defining an end panel section whose longitudinal length is substantially equal to the width of said front panel and a dust flap section extending from said end panel section, the outer edges of the front end flap, bottom end flap and rear flap of one blank being shaped to snugly and completely interfit with the free outer edges of the rear flap, rear panel, top panel and tuck flap of an alternately arranged adjacent blank when the opposite side edges of said blanks are in alignment, the adjacent bottom end section and front end flap of each blank when secured together in overlapped relation forming a composite carton end wall presenting a substantially smooth and unbroken outer surface and a straight and continuous top edge in substantial alignment with the adjacent top edges of the erected front and rear wall panels.

10. One-piece hinged cover carton forming blanks of identical shape and area having end edges designed to snugly and completely interfit when the blanks are alternately arranged in columnar alignment, each of said blanks presenting a front panel, a bottom panel, a rear panel, a top panel and a tuck flap foldably connected by substantially parallel and longitudinally extending scores and serially arranged in the order named, said front and rear panels having a width not less than the width of the bottom panel, said tuck flap presenting tapered end edges contoured to facilitate insertion of the tuck flap into the assembled carton, similar end wall flaps foldably connected to the outer ends of said front panel and similar end wall flaps foldably connected to the ends of the bottom panel along parallel extending transverse scores, and rear flaps foldably connected to the rear edges of said bottom end flaps along longitudinal scores which are substantially in alignment with the bottom and rear panel connecting score, each of said front end flaps having ear portions projecting from the end edges thereof whose free end edges are contoured in reverse conformity to the contour of the tapered end edges of said tuck flap, the outer end edges of adjacent bottom and front end flaps at one end of the blank being substantially in alignment with each other and parallel to the outer end edges of the adjacent bottom and front end flaps at the other end of the blank except for the reversely contoured end edges of thte ear portions extending from said front end flaps, a slit cut extending substantially in alignment with the front and bottom panel connecting score separating the adjacent front and bottom end flaps, each of said bottom end flaps having a longitudinal length greater than the width of said front panel and a score extending transversely across the same thereby defining an end panel section whose longitudinal length is substantially equal to the width of said front panel and a dust flap section extending from said end panel section, each of said front end flaps having a longitudinal length greater than the width of said bottom panel and having a score extending transversely across the same defining an end panel section and a rear panel securing section, the free outer edges of the front flap, bottom end flap and rear flap of one blank being shaped to snugly and completely interfit with the free outer edges of the rear flap, rear panel, top panel and tuck flap of an alternately arranged adjacent blank when the opposite side edges of said blanks are in alignment, the adjacent front and bottom end sections of each blank when secured together in overlapped relation forming a composite carton end wall presenting a substantially smooth and unbroken outer surface and a straight and continuous top edge in substantial alignment with the adjacent top edges of the erected front and rear wall panels.

11. A hinged cover carton formed from a single blank of sheet material and which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front panel having a height substantially equal to the height of said rear panel and said bottom panel having a width substantially equal to the width of said top panel, said tuck flap presenting tapered end edges contoured to facilitate insertion of the tuck flap into the carton, end wall flaps foldably connected to the ends of said bottom panel, each of said bottom end wall flaps presenting substantially parallel end edges and having a transverse width substantially equal to the width of the bottom panel for substantially the full height thereof, a rear panel flap foldably connected to the rear edge of each of said bottom end flaps and overlying said rear panel, an end wall flap foldably connected to each end of said front panel and presenting an end wall section whose width is substantially equal to the width of said bottom panel and whose height is substantially equal to the height of said front panel, a rear panel securing flap foldably connected to each of said front end wall sections and secured to said rear panel, each of said rear panel securing flaps having an ear portion adjacent the top edge thereof whose free edge is contoured in reverse conformity to the tapered end edge of said tuck flap, the adjacent front end sections and bottom end flaps of the carton as secured together in overlapped relation together providing composite carton end walls which present substantially smooth and unbroken outer surfaces and continuous and straight top edges in substantial alignment with the adjacent top edges of the erected front and rear wall panels of the carton.

12. A hinged cover carton formed from a single blank of sheet material and which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front panel having a height substantially equal to the height of said rear panel and said bottom panel having a width substantially equal to the width of said top panel, said tuck flap presenting tapered end edges contoured to facilitate insertion of the tuck flap into the carton, end flaps foldably connected to the ends of said bottom panel, each of said bottom end wall flaps presenting substantially parallel end edges and having a transverse width substantially equal to the width of the bottom panel for substantially the full height thereof, a rear panel flap foldably connected to the rear edge of each of said bottom end flaps and overlying said rear panel, an end flap foldably connected to each end of said front panel and presenting an end wall section whose width is substantially equal to the width of said bottom panel and whose height is substantially equal to the height of said front panel, rear flaps foldably connected to the rear vertical edges of said bottom end flaps and overlying the inside face of said rear panel, and a rear panel securing flap foldably connected to each of said front end wall sections and secured to the outside face of said rear panel, each of said rear panel securing flaps having an ear portion adjacent the top edge thereof whose free edge is contoured in reverse conformity to the tapered end edge of said tuck flap, the adjacent front end sections and bottom end flaps of the carton as secured together in overlapped relation together providing composite end walls which present substantially smooth and unbroken outer surfaces and continuous and straight top edges in substantial alignment with the adjacent top edges of the erected front and rear wall panels of the carton.

13. A hinged cover carton formed from a single blank of sheet material which blank has opposite end edges designed to completely interfit, in snug cut-line contact throughout the transverse width of the blank, with the opposite end edges of two indentical blanks when the three blanks are alternately arranged in columnar alignment, said carton presenting a front panel, a bottom panel, a rear panel, a top panel and a truck flap foldably connected by substantially parallel and longitudinally extending scores, said front and rear panels having a height less than the width of said bottom panel, said tuck flap presenting tapered end edges contoured to facilitate insertion of the tuck flap into the carton, an end wall flap foldably connected to the ends of said bottom panel, each of said bottom end flaps presenting an end panel section whose transverse width is substantially equal to the transverse width of the bottom panel for substantially the full height thereof and whose height is substantially equal to the height of said front panel, a dust flap section integral with and extending from said end panel section, and a rear flap section integral with said end panel section and secured to said rear panel, and end wall flaps integrally connected to the ends of said front panel and overlying said end panel sections, each of said front end flaps having a height substantially equal to the over-all height of the adjacent bottom end section, each of said front end flaps having an ear portion adjacent to the top edge thereof whose free end edge is contoured in reverse conformity to the tapered end edge of said tuck flap, the adjacent bottom end sections and front end flaps of the carton as secured together in overlapped relation together providing composite carton end walls which present substantially smooth and unbroken outer surfaces and continuous and straight top edges in substantial alignment with the adjacent top edges of the erected front and rear wall panels of the carton.

14. A hinged cover carton formed from a single blank of sheet material and which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front and rear panels having a height not less than the width of said bottom panel, said tuck flap presenting tapered end edges contoured to facilitate insertion of the tuck flap into the carton, end wall flaps foldably connected to the ends of said bottom panel, each of said bottom end flaps presenting an end panel section whose width is substantially equal to the width of the bottom panel for substantially the full height thereof and whose height is substantially equal to the height of said front panel, a rear panel flap foldably connected to the rear edge of each of said bottom end panel sections and overlying said rear panel, and a dust flap section integral with and extending from said end panel section, end wall flaps foldably connected to the ends of said front panel and having a length substantially equal to the over-all height of the adjacent bottom end flap, each of said front end flaps having a transverse score defining an end panel section substantially equal in area to the adjacent bottom end panel section and a rear flap section secured to the rear panel, each of said front end flaps having an ear portion adjacent to the top edge thereof whose free end edge is contoured in reverse conformity to the tapered end edge of said tuck flap, the adjacent front end sections and bottom end sections of the carton as secured together in overlapped relation together providing composite end walls which present substantially smooth and unbroken outer surfaces and continuous and straight top edges in substantial alignment with the adjacent top edges of the erected front and rear wall panels of the carton.

References Cited in the file of this patent

UNITED STATES PATENTS

| | | |
|---|---|---|
| 1,088,570 | Hedden | Feb. 24, 1914 |
| 1,090,559 | Morrison | Mar. 17, 1914 |
| 1,523,246 | Berkowitz | Jan. 13, 1925 |
| 1,926,365 | Bergstein | Sept. 12, 1933 |
| 2,048,729 | Daller | July 28, 1936 |
| 2,210,443 | Bergstein | Aug. 6, 1940 |
| 2,429,540 | Woodruff | Oct. 21, 1947 |
| 2,652,969 | Pfaff | Sept. 22, 1953 |